(12) United States Patent
Kanie

(10) Patent No.: US 6,682,126 B2
(45) Date of Patent: Jan. 27, 2004

(54) SIDE VISOR FASTENER

(75) Inventor: Hideki Kanie, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/212,640

(22) Filed: Aug. 5, 2002

(65) Prior Publication Data

US 2003/0038503 A1 Feb. 27, 2003

(30) Foreign Application Priority Data

Aug. 27, 2001 (JP) ........................................ 2001-255864

(51) Int. Cl.7 .................................................. B60J 3/00
(52) U.S. Cl. ....................................... 296/152; 296/154
(58) Field of Search ................................ 296/152, 154; 454/128, 131

(56) References Cited

U.S. PATENT DOCUMENTS 5,251,953 A * 10/1993 Willey ...................... 296/152
6,557,927 B2 * 5/2003 Kanie ......................... 296/152

FOREIGN PATENT DOCUMENTS

| JP | 265723 | * 11/1988 | ................. 296/152 |
| JP | 63-265723 | 11/1988 | |
| JP | 4-124511 | 11/1992 | |
| JP | 2001124022 | 5/2001 | |

* cited by examiner

Primary Examiner—Dennis H. Pedder
(74) Attorney, Agent, or Firm—Edward D. Murphy

(57) ABSTRACT

A side visor fastener (1) comprises a retainer (25) to be fixed to a mounting portion (11) of a frame (3), and a clip for fastening the side visor (1) to a portion of the fastener extending from the retainer (25) to the side visor (1A). The clip includes a receiver clip element (26) to be disposed on the rear side of the side visor (1A), and a pin clip element (27) to be inserted from the front side or outer surface of the side visor (1A) into the receiver clip element (26) through the side visor (1A) so as to engage with the receiver clip element (26). The receiver clip element (26) is integrally connected with the retainer (25) through a thin-walled hinge (29) in a swingable manner in line with an inclination of the side visor (1A) with respect to the frame (3) so that the receiver chip element (26) is served as the portion of the fastener (1) extending from the retainer (25) to support the side visor (1A) through the thin-walled hinge (29). The side visor (1A) is fixed to the frame (3) through the retainer (25) while the side visor (1A) is sandwiched between the receiver clip element (26) and the pin clip element (27).

9 Claims, 9 Drawing Sheets

SIDE VISOR FASTENER

BACKGROUND OF THE INVENTION

The present invention relates to a side visor fastener for fixing a side visor of a motor vehicle to a frame such as a door frame of a vehicle body.

A conventional fastener for a side visor and a side visor fastening process will be described with reference to FIGS. 1, 2, and 3. In FIG. 1, a side visor is fixed, for example at two positions, to a door frame 3 positioned at the upper portion of a door glass 2. A backseat-side side visor 1A is also fixed to a frame positioned at the upper portion of a backseat-side door glass 2A. A conventional side visor fastener 5 for fixing the side visor 1 to the frame 3 is shown in FIGS. 2 and 3, which are sectional views taken along the line A—A of FIG. 1. FIG. 2 shows a process for fixing the side visor 1, and FIG. 3 shows the state after the side visor 1 is fixed to the frame 3.

In FIG. 2, the frame 3 is formed with a retaining portion 7 into which a sealing rubber 6 for receiving the door glass is fitted. The frame 3 is also formed with a bonding surface 9 with which the upper portion of the side visor 1 is brought into surface contact. The lower portion of the bonding surface 9 defines a part of the retaining portion 7 and additionally serves as a mounting portion 11 to which a retainer 10 of the side visor fastener 5 is fixed. The retainer 10 is formed of a metal plate member. For fixing the side visor 1 to the frame 3, the upper portion of the side visor 1 is first attached to the bonding surface 9 of the door frame 3 by means of a double-sided adhesive tape or the like. Then, an attaching portion 13 of the retainer 10 is pushed into the mounting portion 11 of the frame 3, as shown by the arrow 14, to fix the retainer 10 to the frame 3. The retainer 10 includes an extending portion 15 extending along the rear side of the side visor 1, and the extending portion 15 is formed with a fastening hole 18 to be aligned with a fastening hole 17 of the side visor 1. The sealing rubber 6 is then pushed into the retaining portion 7 of the frame 3 in the direction of the arrow 19 and is held by the retaining portion 7. In this state, as shown by the phantom line in FIG. 3, the extending portion 15 of the retainer 10 and the side visor 1 are sandwiched by a clip comprising a pin clip element 21 and a receiver clip element 22 to fasten the side visor 1 to the extending portion 15 of the retainer 10. The receiver clip element 22 has a hollow tubular portion capable of passing through the fastening hole 17 of the side visor 1 and the fastening hole 18 of the retainer 10. When the pin clip element 21 is inserted into the tubular portion of the receiver clip element 22, an engagement portion of the pin clip element 21 engages with an engagement pawl of the receiver clip element 22, and thereby the pin and the receiver clip elements fasten the side visor 1 to the retainer 10 by sandwiching the retainer 10 and the side visor 1 therebetween. Since the retainer 10 is fixed to the frame 3, the side visor 1 is also fixed to the frame 3 through the retainer 10. By fastening the side visor 1 to the retainer 10 in this way, the side visor 1 as attached by the double-sided adhesive tape is firmly fixed to the frame 3.

The aforementioned conventional side visor fastener includes a retainer to be fixed to the mounting portion of the frame, and a clip for fastening the side visor to the portion of the fastener extending from the retainer as fixed to the frame to the side visor. Further, the clip comprises the receiver clip element to be disposed on the rear side of the side visor and the pin clip element to be inserted from the front side of the side visor into the receiver clip element through the side visor so as to engage with the receiver clip element. Thus, the conventional side visor fastener has an advantage of a simple structure. Further, its assembling operation is advantageously facilitated as described above. However, as the design of the side visor is varied depending on types of motor vehicles, the inclination of the side visor with respect to the frame will be variously changed. As a result, a large number of differently sized retainers have heretofore been required to cope with various types and styles of motor vehicles. In particular, as for similar side visors, various corresponding retainers have to be prepared and managed, and each of the retainers has to be fixed to a frame of the corresponding type of motor vehicle without failure. This requires costs and time for preparing the variously sized retainers and managing them, and can undesirably give rise to the risk of attaching an improper retainer or a wrong assembly, during the operation for fixing the retainer to the frame.

In the prior art, it is know to use a clip that has a female member and a male member, wherein after temporarily attaching a component such as an assist grip to a first panel such as a roof lining with the female member, the first panel is aligned with and pushed toward a second panel such as a vehicle body to temporarily attach the component to the second panel with a leg portion of the female member, and then the male member is inserted into the female member to fixedly attach the component to the second panel without any loosing in connection. This clip is directed to temporarily attach the component such as an assist grip to the first panel such as a roof lining and the second panel such as a vehicle body, and then fixedly attach the component to the second panel. Thus, this clip is not suitable for fixing a side visor to a frame with simplified structure and facilitated assembling operation.

SUMMARY OF THE PRESENT INVENTION

According to the present invention, there is provided a side visor fastener for fixing a side visor to a frame of a vehicle body, including a retainer to be fixed to a mounting portion of the frame and a clip for fastening the side visor to a portion of the fastener extending from the retainer as fixed to the frame to the side visor. The clip includes a receiver clip element disposed on the rear side of the side visor and a pin clip element to be inserted from the front side of the side visor into the receiver clip element through the side visor so as to engage with the receiver clip element. In the fastener according to the present invention, the receiver clip element is integrally connected with the retainer through a thin-walled hinge in a swingable manner in response to an inclination of the side visor with respect to the frame, and the receiver clip element is served as the portion of the fastener extending from the retainer to support the side visor through the thin-walled hinge, whereby the side visor is fixed to the frame through the retainer while the side visor is sandwiched between the receiver clip element and the pin clip element.

According to the above mentioned fastener, the receiver clip element can swing with respect to the retainer in line with the inclination of the side visor with respect to the frame, and the receiver clip element serves as the portion of the fastener extending from the retainer to support the side visor. Thus, even if a mounting angle (or inclination) of the side visor with respect to the frame varies, the side visor can be adequately supported only by swinging the receiver clip element with respect to the retainer in each case. That is, even if the angle of the side visor is varied, a structurally and dimensionally identical fastener comprising the retainer and the receiver and pin clip elements can be used. This solves the problem of undesirable costs and time for preparing the various retainers and managing them, and eliminates the risk of occurrence of the wrong assembly of improper retainers, during the operation for fixing the retainer to the frame.

In the above side visor fastener, the thin-walled hinge may be formed in selected one form configurations including a first configuration having a thickness equal to or less than one-half of either thickness of the edges of the retainer and the receiver clip element at the central region between the edges; a second configuration having gradually reduced thicknesses from both the retainer edge and the receiver clip element edge toward the central region; and a third configuration having an even thickness between both the edges, less than either thickness of the edges. Further, the thin-walled hinge may have a length between the edges of the retainer and the receiver clip element which is greater than a specific length required for the hinge function thereof to effect the swing action whereby the thin-walled hinge can adjust a displacement of a fastening hole of the side visor. The receiver clip element may include a tubular portion to be inserted into a fastening hole of the side visor, and an elastic gasket to be brought into close contact with the fastening hole. This can prevent water leakage from the fastening hole of the side visor. The gasket may be substituted with a suction-cup-shaped flange disposed on the outer periphery of the tubular portion to prevent water leakage from a gap between the fastening hole and the tubular portion. In either case, it is preferable to provide a waterproof cap on the tubular portion at the end opposite to the side visor to ward (or receive) water leakage from the tubular portion.

Further, in the above side visor fastener, a second hinge may be integrally interposed between the thin-walled hinge and the receiver clip element to connect the thin-walled hinge to the receiver clip element, the second hinge having a pair of hinge members connecting, in top plan view, the opposite sides of said thin-walled hinge to the opposite sides of said receiver clip element, respectively, so that the second hinge allows the receiver clip element to move with respect to the retainer in a longitudinal direction extending from the retainer to the receiver clip element and in a lateral direction extending crosswise to the longitudinal direction.

Accordingly, it is an object of the present invention to provide a side visor fastener capable of coping with variations in a mounting angle or inclination of a side visor with respect to a frame, while keeping conventional advantages of simplified structure and facilitated assembling operation.

It is another object of the present invention to provide a side visor fastener which overcomes the disadvantages of the prior art and provides a reliable connection between the bolt and the frame of various types and styles of motor vehicles.

It is still another object of the present invention to provide a side visor fastener which is relatively inexpensive, which is simple to produce and easy to assemble.

BRIEF DESCRIPTION OF THE ACCOMPANYING DRAWINGS

Additional advantages and features of the present invention will become apparent from the subsequent description taken in conjunction with the accompanying drawings, wherein:

FIGS. 8A, 8B and 8C show a pin clip element of a side visor fastener according to the preferred embodiment of the present invention, wherein FIG. 8A is a top plan view of the pin clip element, FIG. 8B being a front view of the pin clip element, and FIG. 8C is a sectional view of the pin clip element taken along line C—C of FIG. 8B;

Figure 1:
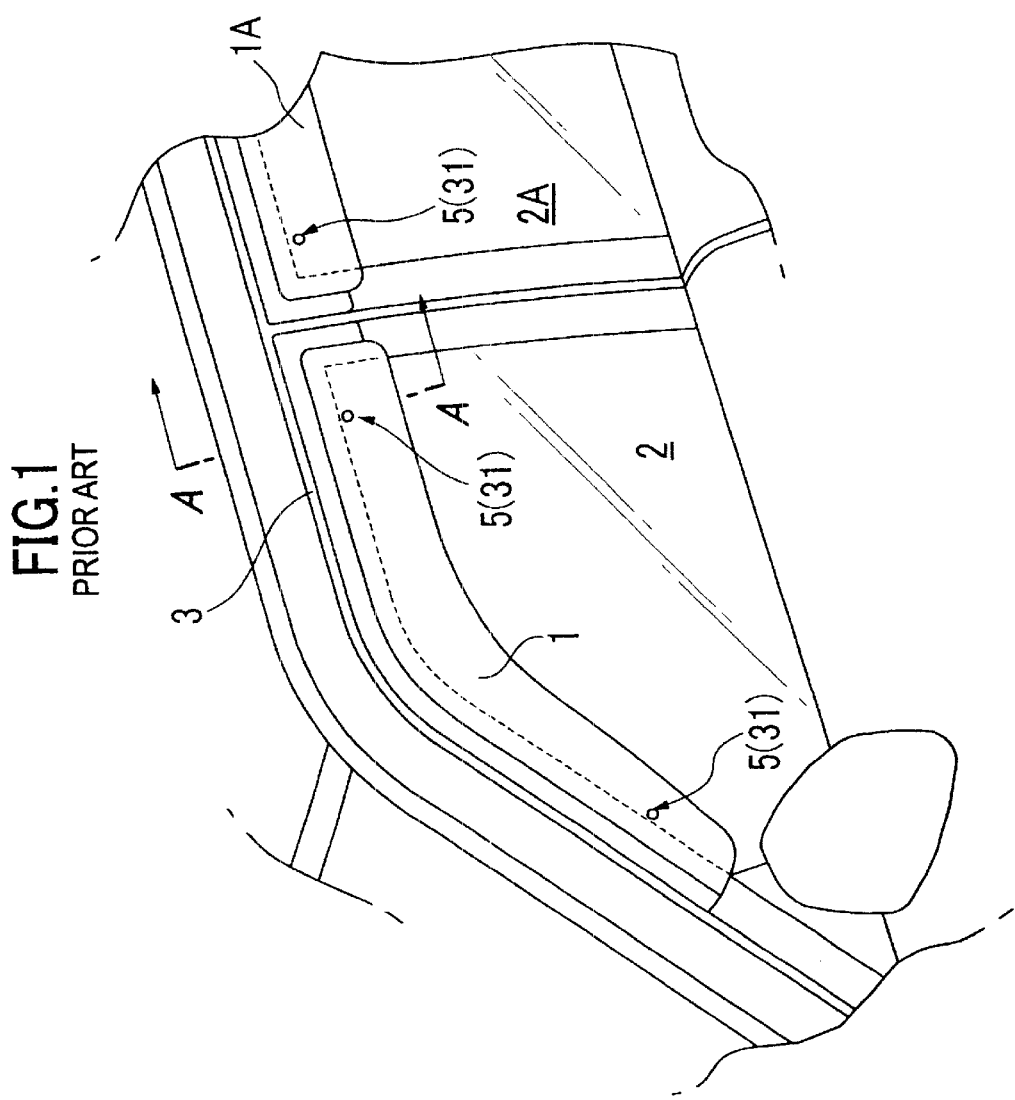
FIG. 1 is a partial perspective view of a motor vehicle in the state that a side visor is fixed to a frame.
Figure 11A:
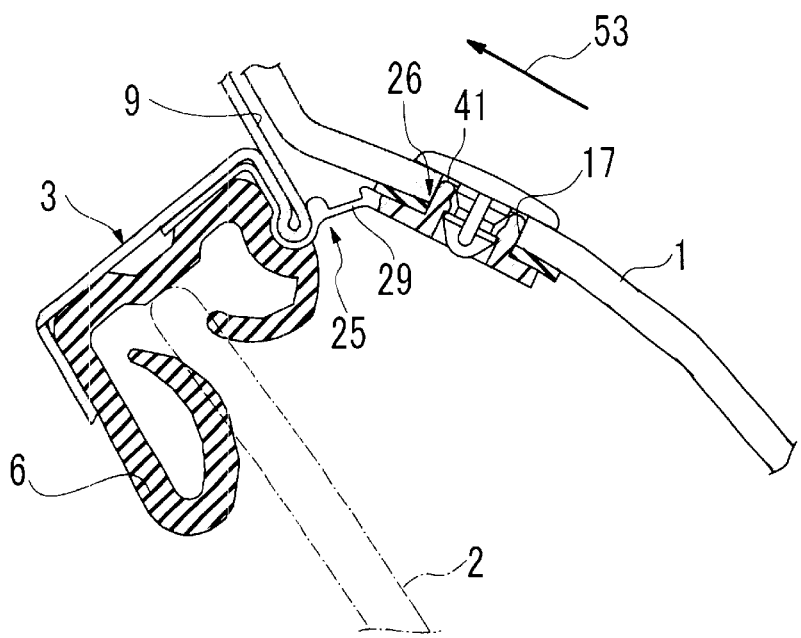
Figure 11B:
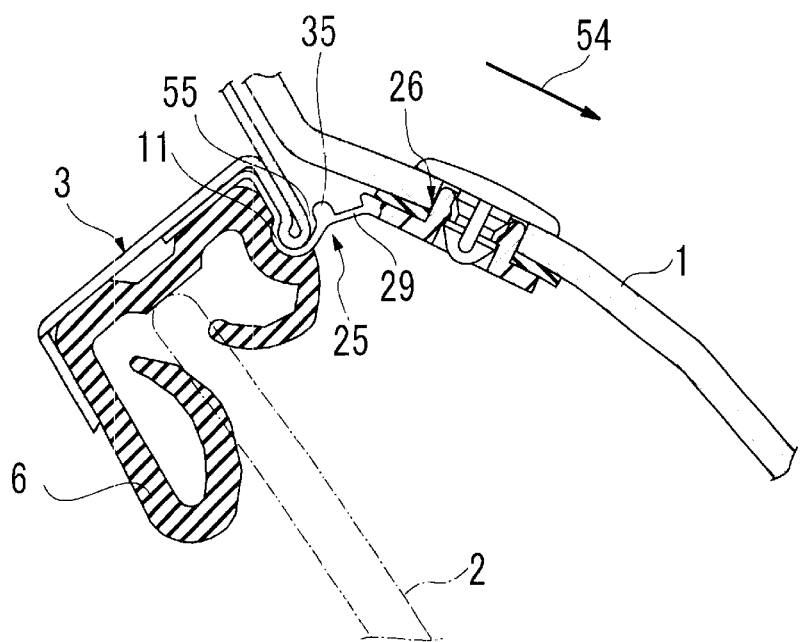
Figure 12:
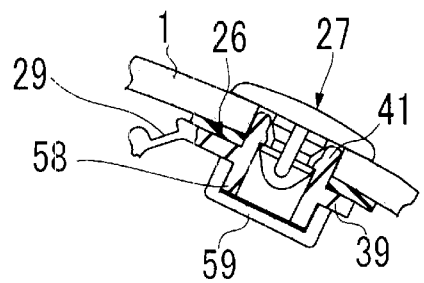
Figure 13:
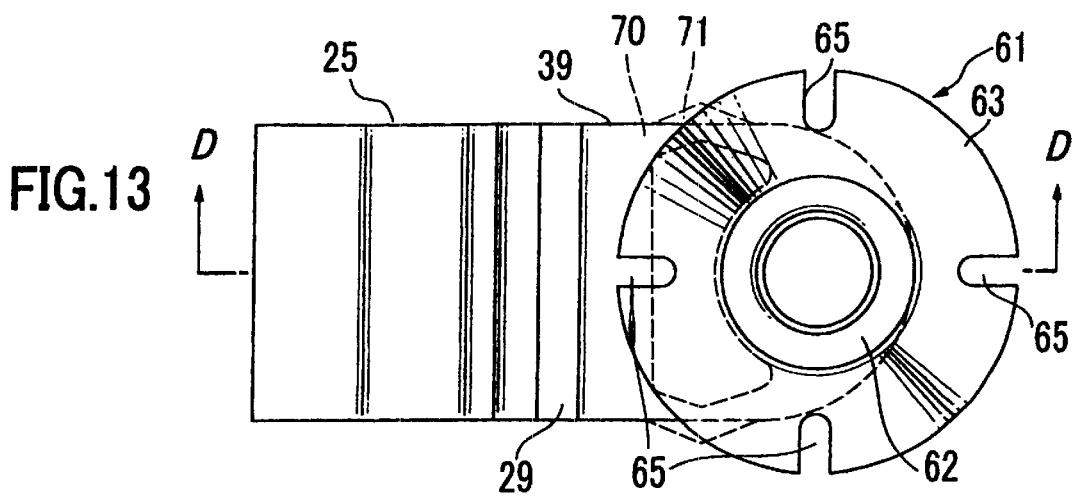
Figure 14:
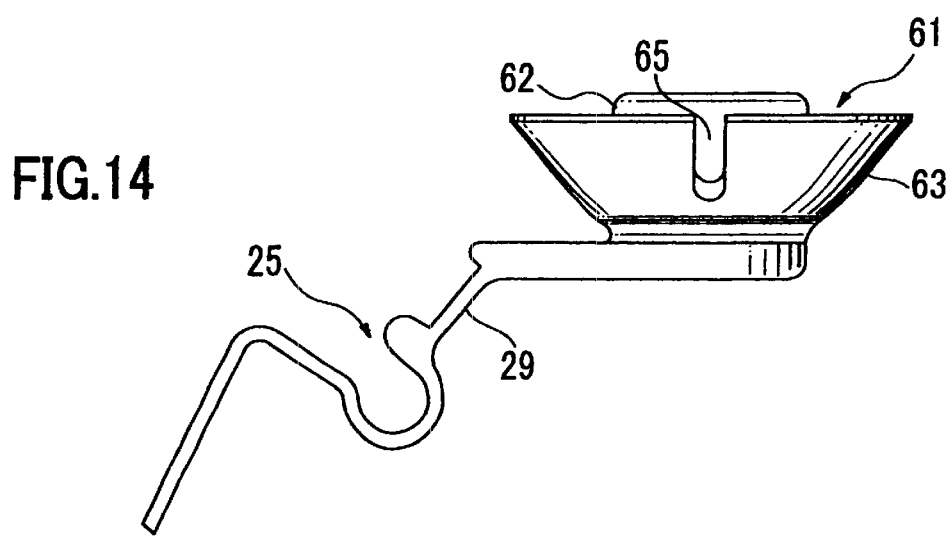
Figure 15:
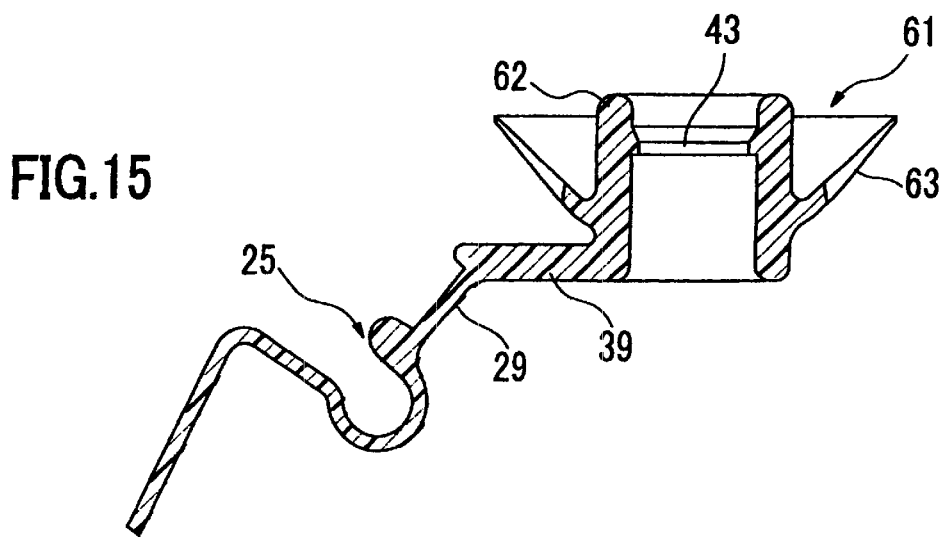
Figure 16:
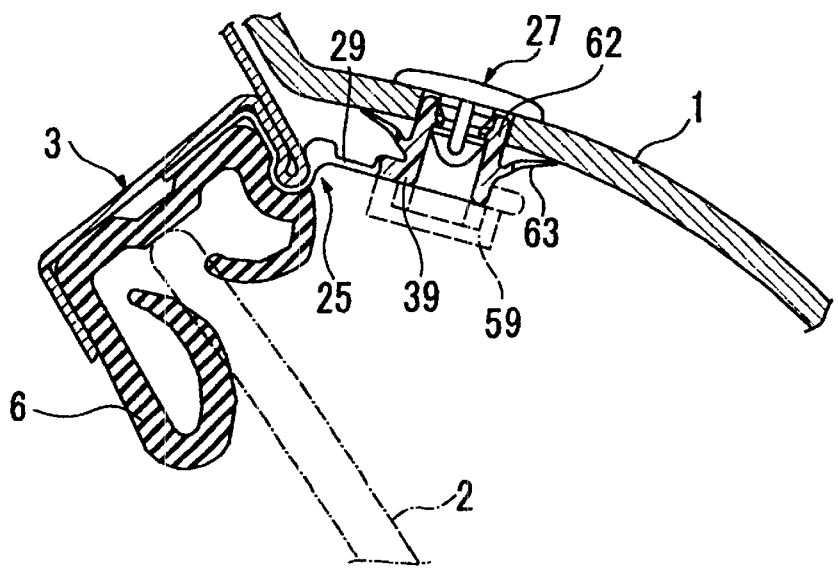
Figure 17:
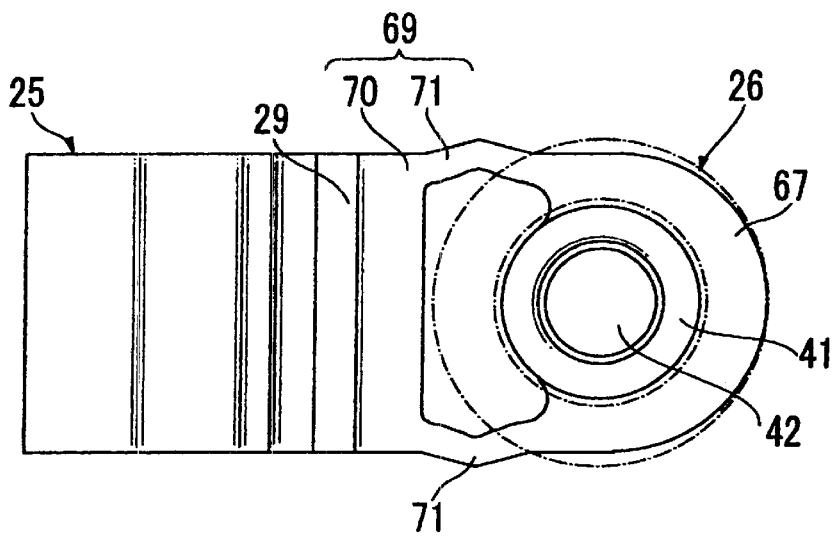
Figure 18:
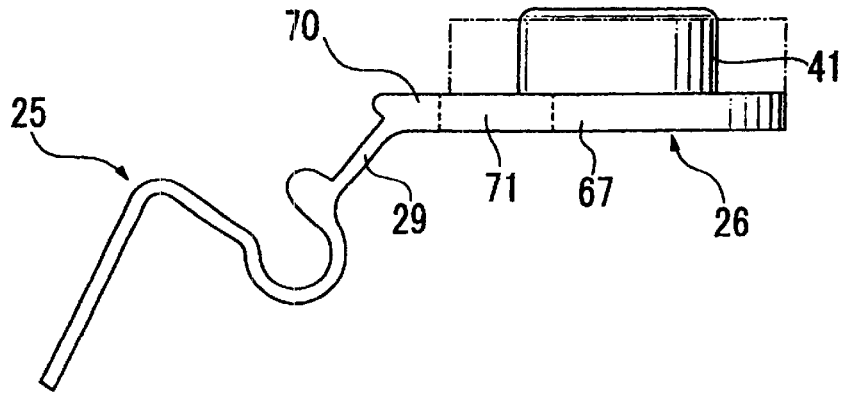

FIGS. 11A and 11B show the relationship of displacement between a fastening hole of a side visor and the receiver clip element and the thin-walled hinge, wherein FIG. 11A shows a fixed state that the fastening hole is misaligned in the direction of the upper portion of the side visor and FIG. 11B shows the fixed state that the thin-walled hinge is so short that the fastening hole is misaligned in the direction of the lower portion of the side visor;

FIG. 12 is a sectional view showing a second embodiment of the present invention wherein the receiver clip element has been modified to receive a waterproof cap;

FIG. 13 is a top plan view of a receiver clip element and a retainer, according to a third embodiment of the present invention;

FIG. 14 is a front view of the receiver clip element and the retainer in FIG. 13;

FIG. 15 is a sectional view of the receiver clip element and the retainer, taken along line D—D of FIG. 13;

FIG. 16 is a sectional view taken along line A—A of FIG. 1 showing the state after the side visor is fixed by using the side visor fastener having the receiver clip element and the retainer in FIG. 13;

FIG. 17 is a top plan view of a receiver clip element and a retainer, according to a fourth embodiment of the present invention;

FIG. 18 is a front view of the receiver clip element and the retainer in FIG. 17.

DETAILED DESCRIPTION OF THE INVENTION

Figure 7A:
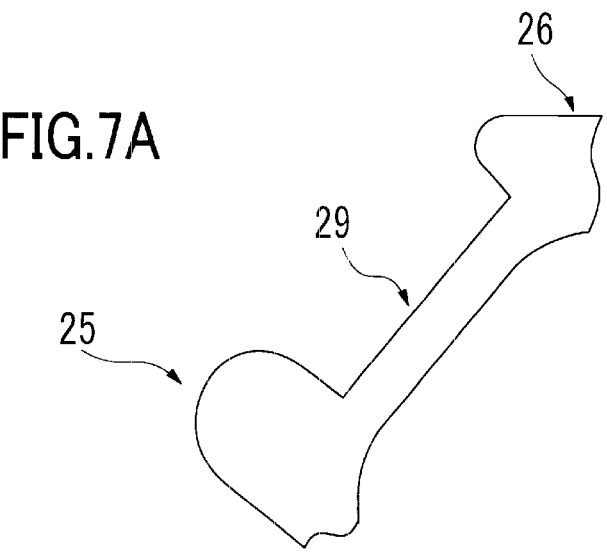
FIGS. 7A, 7B and 7C show various configurations of a thin-walled hinge of the retainer.
Figure 7B:
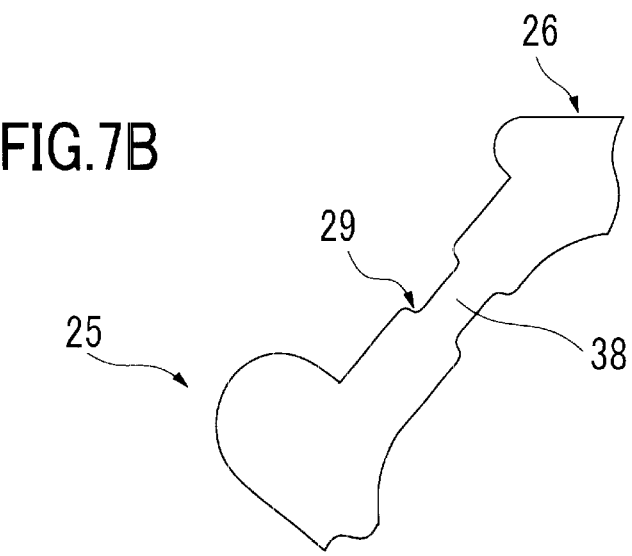
Figure 7C:
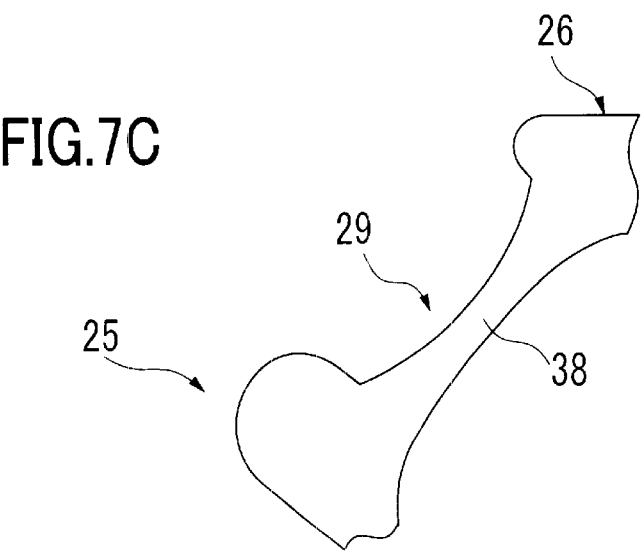
Figure 8A:
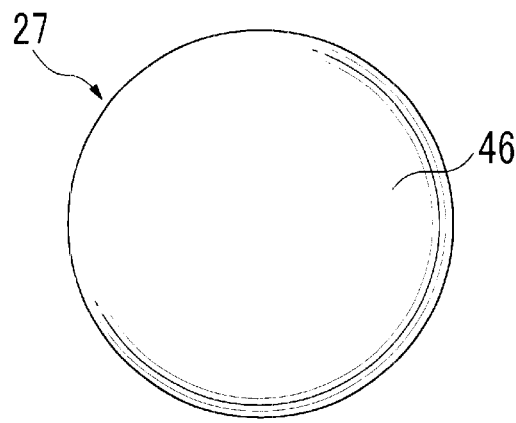
Figure 8B:
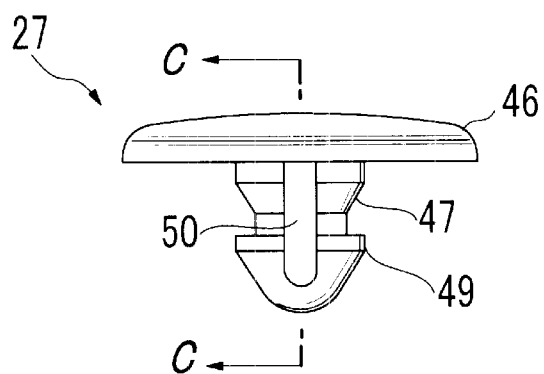
Figure 8C:
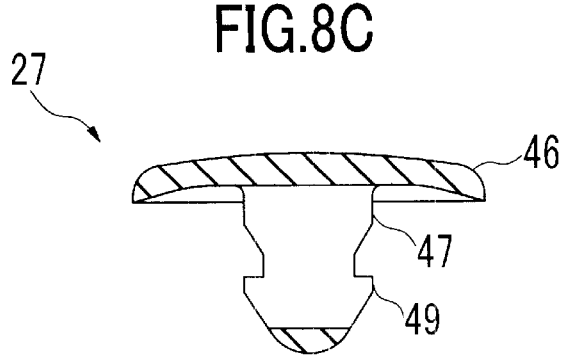
Figure 9:
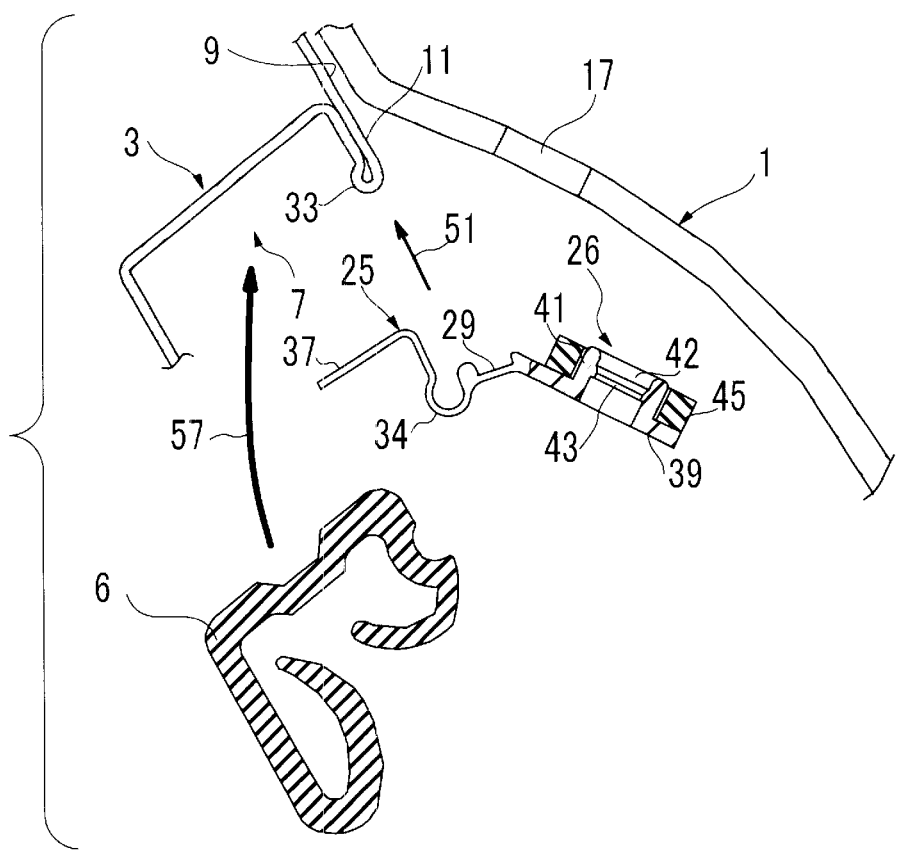
FIG. 9 is a sectional view taken along line A—A of FIG. 1 showing the state before the side visor is fixed by using the side visor fastener of the present invention.
Figure 10:
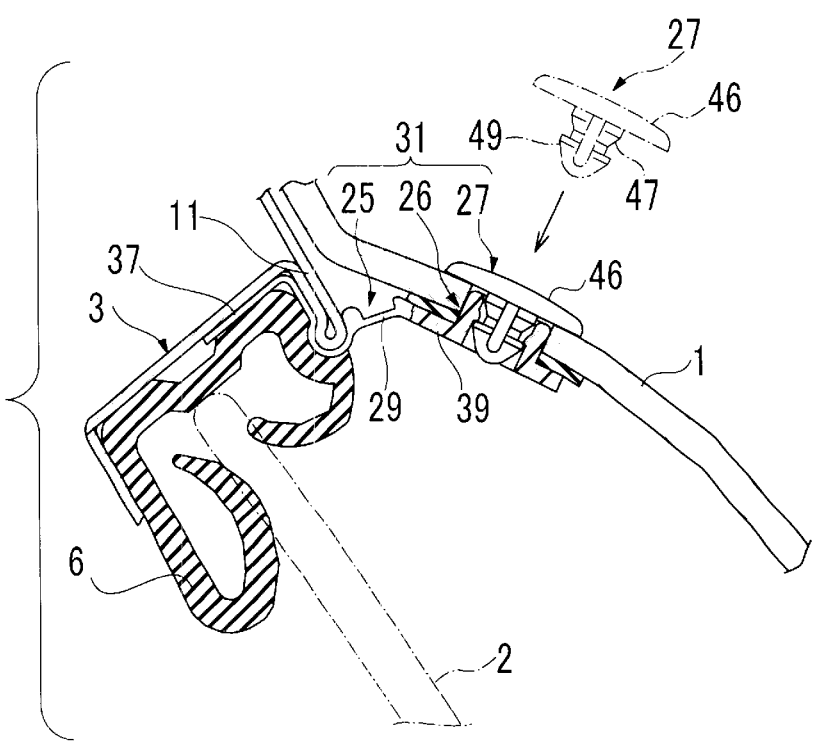
FIG. 10 is a sectional view taken along line A—A of FIG. 1 showing the state after the side visor is fixed by using the side visor fastener of the present invention.

With reference to the drawings, the several embodiments of the present invention will now be described. The preferred or first embodiment of the invention is shown in FIGS. 4 to 12. FIGS. 4 to 8 show details of a retainer 25, a receiver clip element 26 and a pin clip element 27, which constitute a side visor fastener 1. As illustrated in FIGS. 4 to 7C, the retainer 25 and the receiver clip element 26 are formed as an integrally molded product by integrally connected them with one another through a thin-walled hinge 29. As shown in FIGS. 8A, 8B and 8C, the pin clip element 27 is a single component to be inserted into and connected to the receiver clip element 26. FIGS. 9 and 10 show an operation for fixing a side visor 1 to a frame 3 by using the side visor fastener 31 (see FIG. 10) according to the first embodiment of the present invention. In this embodiment, all of the components, namely, the retainer 25, the receiver clip element 26 and the pin clip element 27 are made of plastic material. In particular, since the retainer 25 and the receiver clip element 26 can be integrally formed through the thin-walled hinge 29, they can be molded by simplified forming dies, which provides enhanced productivity, simplified molding and machining processes, lowered cost and facilitated parts management.

Figure 2:
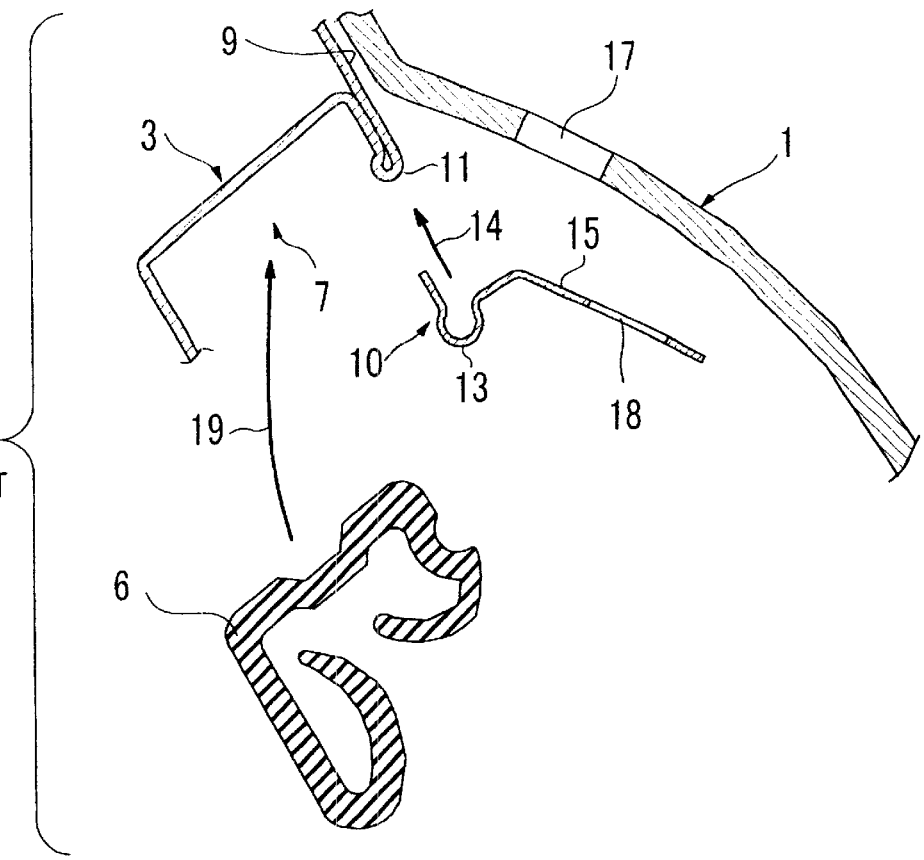
FIG. 2 is a sectional view showing the state before the side visor is fixed by use of a conventional side visor fastener, taken along line A—A of FIG. 1.
Figure 3:
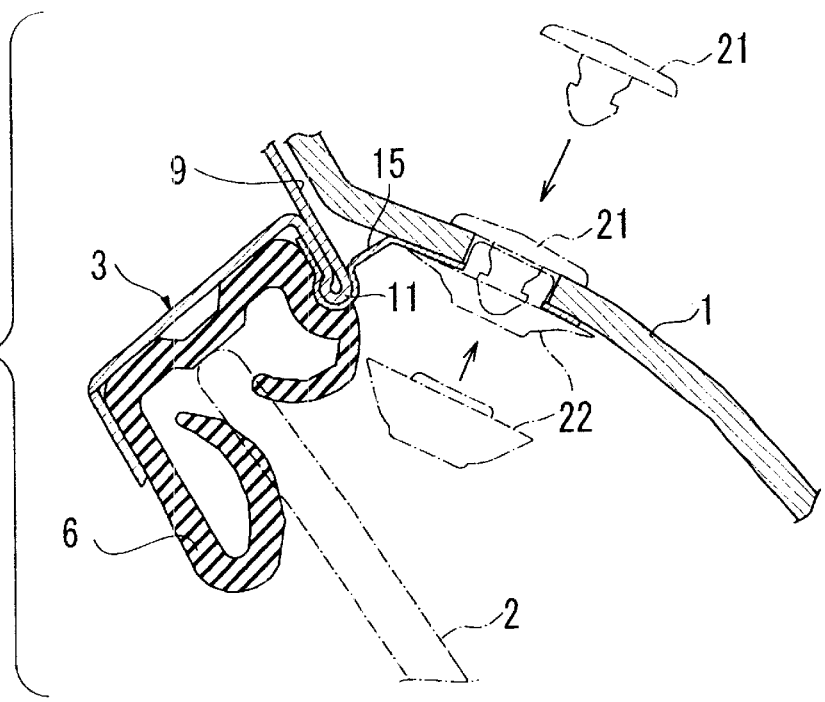
FIG. 3 is a sectional view showing the state after the side visor is fixed by use of the conventional side visor fastener, taken along line A—A of FIG. 1.
Figure 4:
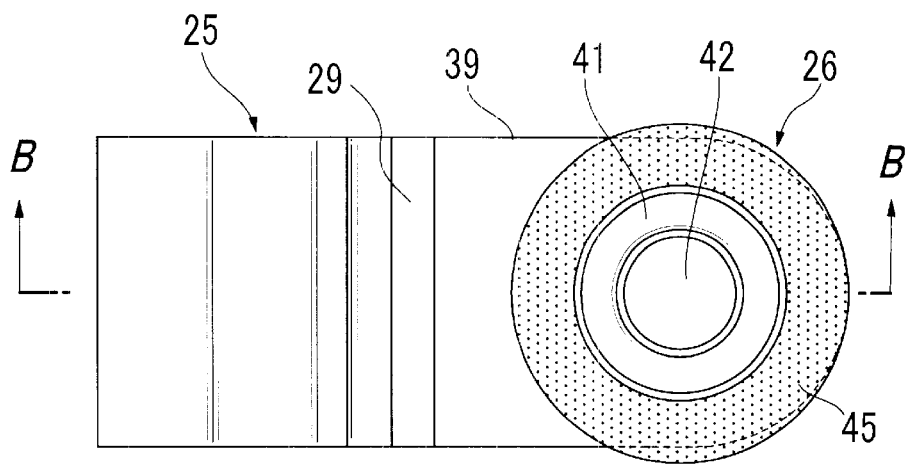
FIG. 4 is a top plan view of a retainer and a receiver clip element of a side visor fastener according to the preferred embodiment of the present invention.
Figure 5:
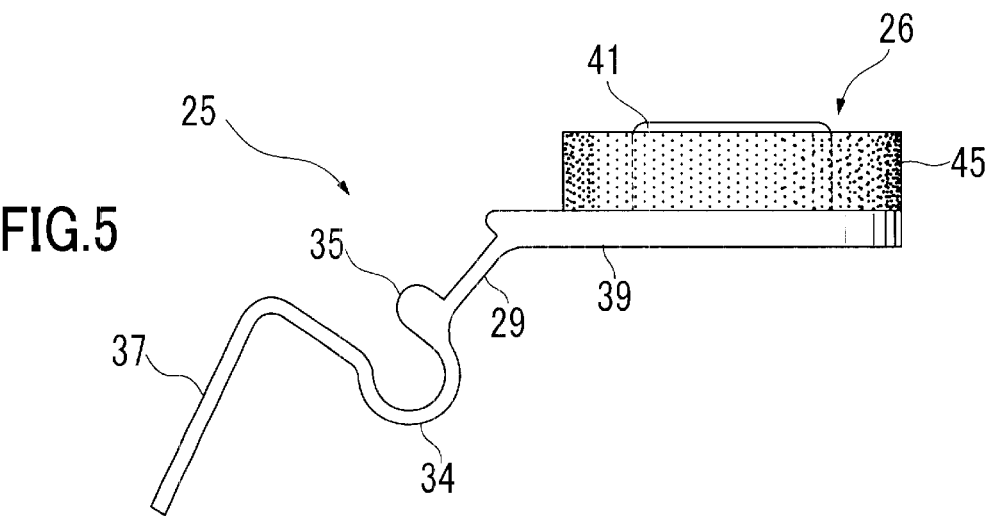
FIG. 5 is a front view of the retainer and the receiver clip element of FIG. 4.
Figure 6:
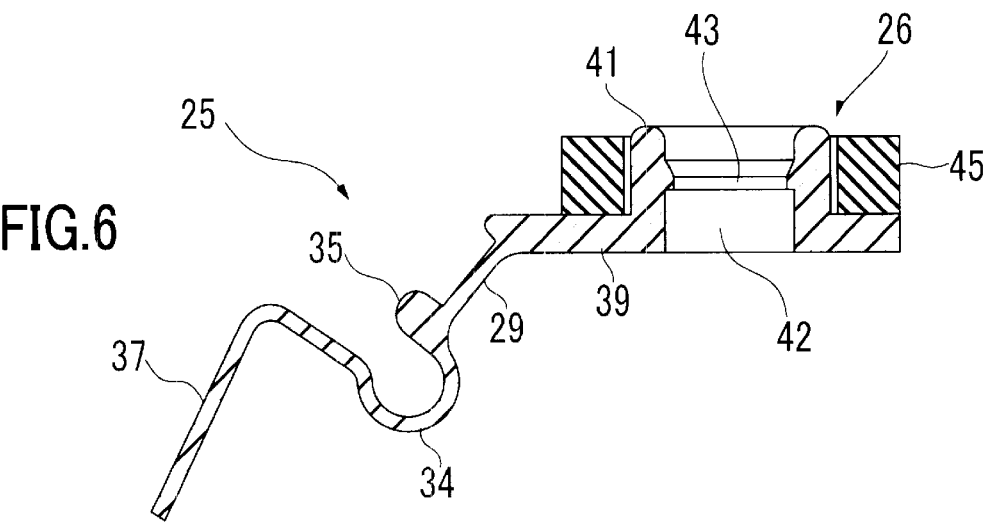
FIG. 6 is a sectional view of the retainer and the receiver clip element, taken along line B—B of FIG. 4.

In FIGS. 4 to 8C, the retainer 25 is formed as a plate member having a sufficient width in its entirety. The retainer 25 includes an attaching portion 34 to be attached to a thick bead 33 at the edge of a mounting portion 11 of the frame 3, such as a door frame in FIG. 9 (or FIG. 1). A support portion 35 is formed adjacent the attaching portion 34 to provide a rigidity required for the clamping action to the thick bead 33 and for continuity in connecting the attaching portion 34 to the thin-walled hinge 29. An extended portion 37 extending from the attaching portion 34 to the opposite side to the support portion 34 is formed on the opposite side of the support portion 34 and adds suitable balance to connection between the thick bead 33 and the attaching portion 34. The support portion 35 is integrally formed with the thin-walled hinge 29 which is connected with the receiver clip element 26 integrally and hingedly, to allow the connected receiver clip element 26 to serve as a portion of the fastener extending from the retainer 25 to support the side visor 1. The extended portion 37 of the retainer 25 on the other side of the receiver clip element 26 extends up to a retaining portion of the door frame 3 into which a sealing rubber 6 is fitted (see FIG. 9 or FIG. 2), so that the extended portion 37 can be pressed and held by the sealing rubber 6. This provides highly maintained mounting strength of the retainer 25 with respect to the mounting portion 11 regardless of the material that the retainer 25 is made of.

The thin-walled hinge 29 connecting the retainer 25 with the receiver clip element 26 is formed as a platy hinge portion having a relatively thin thickness. As shown in FIGS. 7A, 7B and 7C, this thin-walled hinge 29 may be formed as a platy hinge portion having any suitable configuration capable of providing a hinge function allowing the receiver clip element 26 to swing with respect to the retainer 25. For example, as shown in FIG. 7A, the thin-walled hinge 29 may be formed in a configuration having an even (or uniform) thickness between the edge of the support portion 35 of the retainer 25 and the edge of the receiver clip element 26, with the thickness being less than any of both the edges. Alternatively, as shown in FIG. 7B, the thin-walled hinge 29 may be formed in a configuration having a thickness equal to or less than one-half of any thickness of both the retainer support portion 35 and the receiver clip element 26 at a central region 38 therebetween. Alternatively, as shown in FIG. 7C, the thin-walled hinge 29 may be formed in a configuration having gradually reduced thicknesses from both edges of the retainer support portion 35 and the receiver clip element 26 toward the central region thereof.

Further, the thin-walled hinge 29 has a length between the edge of the support portion 35 of the retainer 25 and the edge of the receiver clip element 26 with the length being greater than a specific length required for the hinge function thereof to effect the swing action. Thus, the thin-walled hinge 29 can adjust a displacement between a fastening hole 17 of the side visor 1 and a hole 42 of the receiver clip element 27 into which the pin clip element 27 is inserted (a displacement in the longitudinal direction of the retainer 25 and the receiver clip element 26).

The receiver clip element 26 is formed to provide extending from the retainer 25 through the thin-walled hinge 29 to be brought into surface contact with the rear side of the side visor 1 so as to support the side visor 1. The receiver clip 26 includes a base plate portion 39 to be brought into surface contact with the rear side of the side visor 1, and a tubular portion 41 standing from the base plate portion 29 and having a configuration capable of being inserted into the fastening hole 17 of the side visor 1. The tubular portion 41 is formed with the hole 42 for receiving therein a shank 47 of the pin clip element 27. An engagement portion 43 is adapted to engage with an engagement head 49 of the shank 47 of the pin clip element 27 is formed on the inner periphery of the hole 42. The base plate portion 39 serving as the portion to support the side visor 1 has a relatively wide area allowing the rear side of the side visor 1 to be stably brought into surface contact therewith. The thin-walled hinge 29 is integrally connected with the end of the base plate portion 39. Further, an annular elastic gasket 45 to be brought into close contact with the fastening hole of the side visor 1 is attached on the outer periphery of the tubular portion 41. This can prevent water leakage such as rainwater leaking from a gap between the fastening hole of the side visor 1 and the tubular portion 41.

FIG. 8A is a top plan view of the pin clip element 27, FIG. 8B is a front view of the pin clip element 27, and FIG. 8C is a sectional view taken along line C—C of FIG. 8B. The pin clip element 27 is made of plastic material. The pin clip element 27 has a large flange 46 to be seated on the outer surface or front side of the side visor 1 and the shank 47 extends downwardly from the flange 46. The enlarged engagement head 49 is formed at the end of the shank 47 opposite the flange 46. Thus, when the shank 47 is inserted into the hole 42 of the receiver clip element 26, it can engage with the engagement portion 43 to fasten the pin clip element 27 to the receiver clip element 26. The shank 47 is also formed with an axially extending slit 50 at the central region thereof. This allows the shank 47 to be inwardly deformed when inserted into the hole 42 of the tubular portion 41 of the receiver clip element 26, to facilitate engaging the engagement head 49 with the engagement portion 43.

With reference to FIGS. 9 and 10, explanation will be made on an operation for fixing the side visor 1 to the frame 3, such as a door frame, by use of the side visor fastener 31 comprising the retainer 25, the receiver clip element 26 and the pin clip element 27. In FIG. 9, for fixing the side visor 1 to the frame 3, the upper portion of the side visor 1 is first attached to the bonding surface 9 of the door frame 3 by means of a double-sided adhesive tape or the like (not shown). Then, the attaching portion 34 of the retainer 25 is pushed into the bead 33 of the mounting portion 11 of the frame 3 as shown by the arrow 51 to fix the retainer 25 to the frame 3. The receiver clip element 26 is swingably connected with the retainer 25 through the thin-walled hinge 29, so that the receiver clip element 26 is attached to the frame 3 as is. Thus, the receiver clip element 26 serves as the portion extending along the rear side of the side visor 1 to support the side visor 1. The receiver clip element 26 is swingably connected to the retainer 25 through the thin-walled hinge 29. Thus, even if the inclination of the side visor 1 with respect to the frame 3 varies depending on the type and style of the side visor 1, the base plate portion 39 of the receiver clip element 26 is stably brought into contact with the rear side of the side visor 1 by swinging the receiver clip element 26 in response to variations of the inclination, and the tubular portion 41 standing from the base plate portion 39 can be aligned with the fastening hole 17 of the side visor 1 and inserted thereinto.

Through this insertion operation, the gasket 45 closely fits with the gap between the tubular 41 and the fastening hole 17 by its elasticity to prevent water leakage. Further, since the length of the thin-walled hinge 29 between the edge of the support portion 35 of the retainer 25 and the edge of the receiver clip element 26 is arranged to be greater than a specific length required for the hinge function of the thin-walled hinge 29 to effect the swing action, the thin-walled hinge 29 can adjust a displacement between the fastening hole 17 of the side visor 1 and the hole 42 of the tubular portion 41 of the receiver clip element 27 (a displacement in the longitudinal direction of the retainer 25 and the receiver clip element 26). This condition will be described with reference to FIG. 11A. When the fastening hole 17 of the side visor 1 is displaced or misaligned in the direction of the upper portion of the side visor 1, the receiver clip element 26 is displaced in the direction of the upper portion of the side visor 1 in response to the displacement as shown by the arrow 53, and the thin-walled hinge 29 is bent by virtue of its elasticity. Conversely, when misaligned in the direction of the lower portion of the side visor 1, the receiver clip element 26 is displaced in the direction of the lower portion of the side visor 1 in response to the displacement, and the thin-walled hinge 29 is stretched within its length. If the thin-walled hinge 29 does not have such a long length, when the fastening hole 17 is misaligned in the direction of the lower portion of the side visor 1, the receiver clip element 26 is displaced in the direction of the lower portion of the side visor 1 in response to the displacement, and the thin-walled hinge 29 pulls the support portion 35 of the retainer 25 to create a gap 55 between the support portion 35 and the mounting portion 11 of the frame 3 as shown by the arrow 54 of FIG. 11B, resulting in lowered mounting strength of the retainer 25 with respect to the frame 3. On the other hand, when the attaching portion 34 of the retainer 25 is attached to the mounting portion 11 of the frame 3, the extended portion 37 of the retainer 25 is seated on the bottom surface of the retaining portion 7 of the frame 3.

Then, the sealing rubber 6 is pushed into the retaining portion 7 of the frame 3 as shown by the arrow 57 (or 19) and is held therein. Through this push-in operation, the extended portion 37 of the retainer 25 is pressed and held by the sealing rubber 6 in the retaining portion 7. This provides a high mounting strength of the retainer 25 with respect to the frame regardless of the material that the retainer 25 is made of, to thereby prevent the attaching portion 34 of the retainer 25 from accidentally disengaging from the mounting portion 11 of the frame 11. In this state as shown by the phantom line or chain line in FIG. 10, with taking the pin clip element 27 by hand, the shank 47 of the pin clip element 27 is inserted into the hole 47 of the tubular portion 41 of the receiver clip element 26 which is inserted into the fastening hole 17 of the side visor 1. Thus, the engagement head 49 of the shank 46 of the pin clip element engages with the engagement portion 43 of the receiver clip element 26, so that the side visor 1 is sandwiched between the flange 45 of the pin clip element 27 and the receiver clip element 26. As described previously, the receiver clip element 26 is connected with the retainer 25 and the retainer 25 is fixed to the mounting portion 11 of the frame 3. Thus, the side visor 1 is fixed to the frame 3 through the receiver clip element 26 and the retainer 25. As above, the side visor fastener of the present invention achieves facilitated attaching operation with simplified structure as with the conventional side visor fastener. Further, this fastener can accommodate or cope with variations in mounting angle (or inclination) of the side visor with respect to the frame, and can be molded by simplified forming dies.

FIG. 12 shows a second embodiment of the present invention in which the receiver clip element 26 has the tubular portion 41 standingly formed on the base plate portion 39 has formed thereon an extended tubular portion 58 extending in the opposite direction of the side visor 1. The end of the extended tubular portion 58 is provided with a waterproof cap 59 for receiving or warding water leakage from the tubular portion 41. The waterproof cap 59 can prevent water entered into the hole 42 of the tubular portion 41 or the like from leaking through the hollow tubular portion 41 to the rear side of the side visor 1. In addition to the cap 59, the waterproof for the gap between the fastening hole and the outer periphery of the tubular portion 41 is assured by the elastic gasket. This provides an enhanced waterproof effect.

FIGS. 13 to 16 show a third embodiment of the present invention in which a receiver clip element 61 is formed in place of the receiver clip element 26. Otherwise, the retainer 25 and the thin-walled hinge 29 are the same as those shown in FIGS. 4 to 11. The receiver clip element 61 includes a tubular portion 62 standingly formed on a base plate portion 39 to be inserted into the fastening hole 17 of the side visor 1, and a suction-cup-shaped flange 63 disposed on the outer periphery of the tubular portion 62 and expanded upwardly and radially outward from a position adjacent to the base plate portion 39. This suction-cup-shaped flange 63 is provided as a substitute for the elastic gasket 45, to prevent water leakage from a gap between the fastening hole 17 of the side visor 1 and the tubular portion 62. The suction-cup-shaped flange 63 is formed with a plurality of radially extending short slits 65 equally spaced each other around the outer edge thereof to assure enhanced contact and attachment to the rear side of the side visor 1. Further, the thickness of the suction-cup-shaped flange 63 adjacent to the tubular portion is arranged to be greater than that on the side of the outer edge to provide a high strength. In the fixed state as shown in FIG. 16, the suction-cup-shaped flange 63 sticks well to the rear side of the side visor 1 and receive water from the gap between the fastening hole 17 of the side visor 1 and the tubular portion 62 to prevent the water from leaking on the side of the glass 2. In this embodiment, the waterproof cap 59 shown only in FIG. 12 for receive or ward water leakage from the tubular portion may also be provided at the edge of the tubular portion 62 on the other side of the side visor 1, with a slight modification of the structure of the receiver clip element 61.

FIGS. 17 and 18 show a fourth embodiment of the fastener including a retainer 25 and a receiver clip element 26, in particular, a connection portion of a thin-walled hinge 29 to the receiver clip element 26. The retainer 25 and the thin-walled hinge 29 are substantially the same as those shown in FIGS. 4 to 11, and the receiver clip element 26 is the same as that shown in FIGS. 4 to 11 except for a base plate portion which will be described in detail hereinafter. In the fourth embodiment, the connection of the thin-walled hinge 29 to the receiver clip element 26 is different from that shown in FIGS. 4 to 11. In the fourth embodiment, a second hinge 69 is integrally interposed between the thin-walled hinge 29 and a substantially circular-shaped base plate portion 67 of the receiver clip element 26 to connect the thin-walled hinge 29 to the receiver clip element 26. The second hinge 69 includes a thick plate portion 70 integrated with the thin-walled hinge 29, and a pair of spaced hinge members 71 extending from the thick plate portion 70 and connecting opposite sides of the thin-walled hinge 29 to opposite sides of the receiver clip element 26, respectively, when seen in top plan view. Preferably, each mid-portion of the hinge members 71 is formed in a slightly outwardly bent, when seen in top plan view. The second hinge 69 allows the receiver clip element 26 to move with respect to the retainer 25 in a longitudinal direction extending from the retainer 25 to the receiver clip element 26 (rightward and leftward in FIG. 17) and in a lateral direction extending crosswise to the longitudinal direction (upward and downward in FIG. 17). Thus, depending on the displacement of the fastening hole 17 of the side visor 1, the mounting position of the receiver clip element can be adjusted along the vertical profile of a vehicle body and the longitudinal direction of the vehicle body.

According to the present invention, the receiver clip element can swing with respect to the retainer in line with the inclination of the side visor with respect to the frame, and the receiver clip element serves as the portion of the fastener extending from the retainer to support the side visor. Thus, even if a mounting angle (or inclination) of the side visor with respect to the frame varies, the side visor can be adequately supported only by swinging the receiver clip element with respect to the retainer in each case. That is, even if the angle of the side visor is varied, a structurally and dimensionally identical fastener comprising the retainer and the receiver and pin clip elements can be used. This solves the problem of undesirable costs and time for preparing the various retainers and managing them, and eliminates the risk of occurrence of the wrong assembly of improper retainers, during the operation for fixing the retainer to the frame. Further, since the retainer and the receiver clip can be integrally formed through the thin-walled hinge, they can be molded by simplified forming dies to achieve enhanced productivity.

In general, the above-identified embodiments are not to be construed as limiting the breadth of the present invention. It is understood that other modifications or other alternative constructions will be apparent which are within the scope of the invention as defined in the appended claims.

What is claimed is:

1. A side visor fastener for fixing a side visor to a frame of a vehicle body, comprising:
   a. a retainer to be fixed to a mounting portion of the frame;
   b. a clip having a receiver clip element and a pin clip element;
   c. a thin-walled hinge interconnecting the retainer and the clip;
   d. the receiver clip element adapted to be disposed on the rear side of the side visor and the pin clip element to be inserted from the front side of the side visor into the receiver clip element through the side visor to engage with the receiver clip element wherein the receiver clip element is integrally connected as a single piece with the retainer through the thin-walled hinge in a swingable manner in response to an inclination of the side visor and with respect to the frame, and
   e. the receiver clip element is served as the portion of the fastener extending from the retainer to support the side visor through the thin-walled hinge, whereby the side visor is fixed to the frame through the retainer while the side visor is sandwiched between the receiver clip element and the pin clip element.

2. A side visor fastener for fixing a side visor to a frame of a vehicle body, comprising:
   a. a retainer to be fixed to a mounting portion of the frame;
   b. a clip having a receiver clip element and a pin clip element;
   c. a thin-walled hinge interconnecting the retainer and the clip;
   d. the receiver clip element adapted to be disposed on the rear side of the side visor and the pin clip element to be inserted from the front side of the side visor into the receiver clip element through the side visor to engage with the receiver clip element wherein the receiver clip element is integrally connected with the retainer through the thin-walled hinge in a swingable manner in response to an inclination of the side visor and with respect to the frame,
   e. the receiver clip element is served as the portion of the fastener extending from the retainer to support the side visor through the thin-walled hinge, whereby the side visor is fixed to the frame through the retainer while the side visor is sandwiched between the receiver clip element and the pin clip element; and
   f. the thin-walled hinge is selected from the group consisting of a configuration having a thickness equal to or less than one-half of the thickness of an edge of the retainer or an edge of the receiver clip element in the central region between the edge of the retainer and the edge of the receiver clip element, a configuration having a gradually reduced thickness from the retainer edge and the receiver clip element edge toward a central region therebetween, and a configuration having an even thickness between the retainer edge and the receiver clip element edge, with the configuration having a thickness which is less than either of the edges.

3. The combination claimed in claim 2 wherein:
   a. the thin-walled hinge has a predetermined length extending between the edges of the retainer and the receiver clip element which length is greater than the specific length required for the hinge function thereof which effects a swinging action, whereby the displacement of the thin-walled hinge self-adjusts between the receiver clip element and the fastening hole of the side visor.

4. The combination claimed in claim 3 wherein:
   a. the receiver clip element has a tubular portion;
   b. the side visor has a fastening hole;
   c. the tubular portion of the receiver clip element is inserted into the fastening hole of the side visor; and
   d. an elastic gasket is mounted on the tubular portion to be brought into close contact with the side visor about the fastening hole.

5. The combination claimed in claim 4 wherein:
   a. a waterproof cap is mounted on the end of the tubular portion remote from the side visor to receive water leakage from the tubular portion.

6. The combination claimed in claim 3 wherein:
   a. the receiver clip element has a tubular portion;
   b. the side visor has a fastening hole;
   c. the tubular portion of the receiver clip element is inserted into the fastening hole of the side visor; and d. a suction-cup-shaped flange is formed on the outer periphery of said tubular portion to prevent water leakage from between the fastening hole and the tubular portion.

7. The combination claimed in claim 6 wherein:

a. a waterproof cap is mounted on the end of the tubular portion remote from the side visor to receive water leakage from the tubular portion.

8. The combination claimed in claim 4 wherein:

a. the receiver clip element has opposite sides;

b. another hinge is formed between the thin-walled hinge and the receiver clip element, with the another hinge having a pair of hinge members connecting opposite sides of the another hinge to the opposite sides of the receiver clip element, whereby the another hinge allows the receiver clip element to move with respect to the retainer in a longitudinal direction extending from said retainer to said receiver clip element, and in a lateral direction extending crosswise to the longitudinal direction.

9. The combination claimed in claim 6 wherein:

a. the receiver clip element has opposite sides; and b. another hinge is formed between the thin-walled hinge and the receiver clip element, with the another hinge having a pair of hinge members connecting opposite sides of the another hinge to the opposite sides of the receiver clip element, whereby the another hinge allows the receiver clip element to move with respect to the retainer in a longitudinal direction extending from said retainer to said receiver clip element, and in a lateral direction extending crosswise to the longitudinal direction.

* * * * *